United States Patent [19]

Maiya et al.

[11] Patent Number: 5,725,218
[45] Date of Patent: Mar. 10, 1998

[54] HIGH TEMPERATURE SEAL FOR JOINING CERAMICS AND METAL ALLOYS

[75] Inventors: P. Subraya Maiya, Darien; John J. Picciolo, Lockport; James E. Emerson, Plainfield; Joseph T. Dusek, Lombard; Uthamalingam Balachandran, Hinsdale, all of Ill.

[73] Assignee: The University of Chicago, Chicago, Ill.

[21] Appl. No.: 749,980

[22] Filed: Nov. 15, 1996

[51] Int. Cl.⁶ .................... F16J 15/14; C03C 8/24
[52] U.S. Cl. .................... 277/1; 277/227; 501/15; 501/17
[58] Field of Search ............ 277/1, 227, DIG. 6; 585/500, 943; 501/14, 15, 17, 32, 41, 49

[56] References Cited

U.S. PATENT DOCUMENTS

| | | | |
|---|---|---|---|
| 3,706,582 | 12/1972 | Meyer | 106/39 R |
| 4,076,991 | 2/1978 | Datta | 501/15 |
| 4,199,704 | 4/1980 | Varshneya et al. | 313/221 |
| 4,927,475 | 5/1990 | Steinleitner et al. | 501/17 |
| 5,137,849 | 8/1992 | Brix et al. | 501/15 |
| 5,179,047 | 1/1993 | Chiba | 501/15 |
| 5,202,292 | 4/1993 | Tanabe et al. | 501/17 |
| 5,416,049 | 5/1995 | Mattox | 501/17 |
| 5,453,331 | 9/1995 | Bloom et al. | 429/32 |
| 5,580,497 | 12/1996 | Balachandran et al. | 252/519 |

*Primary Examiner*—William A. Cuchlinski, Jr.
*Assistant Examiner*—John L. Beres
*Attorney, Agent, or Firm*—Emrich & Dithmar

[57] ABSTRACT

For a combination of a membrane of $SrFeCo_{0.5}O_x$ and an Inconel alloy, a high-temperature seal is formed between the membrane and the alloy. The seal is interposed between the alloy and the membrane, and is a fritted compound of Sr oxide and boric oxide and a fritted compound of Sr, Fe and Co oxides. The fritted compound of $SrFeCo_{0.5}O_x$ is present in the range of from about 30 to 70 percent by weight of the total sealant material and the fritted compound of Sr oxide and boric oxide has a mole ratio of 2 moles of the Sr oxide for each mole of boric oxide. A method of sealing a ceramic to an Inconel metal alloy is also disclosed.

24 Claims, 3 Drawing Sheets

HIGH TEMPERATURE SEAL FOR JOINING CERAMICS AND METAL ALLOYS

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to an improved seal for joining ceramics and metal alloys. More particularly, this invention relates to a seal useful for joining ceramics and metal alloys in a apparatus and system for converting methane gas to syngas with oxygen. The oxygen for the oxidation step is obtained from air by an oxygen-selective ceramic membrane extruded from $SrFeCo_{0.50}O_x$ (known as SFC-2). Preferably, the ceramic membrane is in the form of a tube which in the past has exhibited significant mechanical stability and good oxygen permeability. Currently, methane conversion reactors that use such SFC-2 membranes are being considered for engineering-scale and, eventually, commercial plants. The large and complex ceramic structures needed for commercial applications will require ceramic-ceramic and ceramic-metal joining of small components. Seals adequate to hold external pressures of more than 100 psig at the reactor operating temperature of about 800°–900° C. are required. Inconel metal alloys are leading candidates because of the oxidation-resistant nature of these nickel-based alloys. A major problem with ceramic-metal seals is the difference in the coefficient of thermal expansion between the two materials when the components are repeatedly cycled between room temperature and the reactor operating temperature. Traditional silicate bonding sealants such as those used to bond high-strength glass to Inconel 718 are not suitable because of the high temperatures and because of the reactivity with the ceramic membrane materials.

SUMMARY OF THE INVENTION

It is an object of the invention to provide a sealant and a method of making the sealant, wherein the sealant is based on a fritted compound of strontium oxide and boric oxide, together with SFC-2.

Yet another object of the invention is to provide a sealant and a method for its use in joining oxygen-selective membranes and oxidation-resistant metals.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
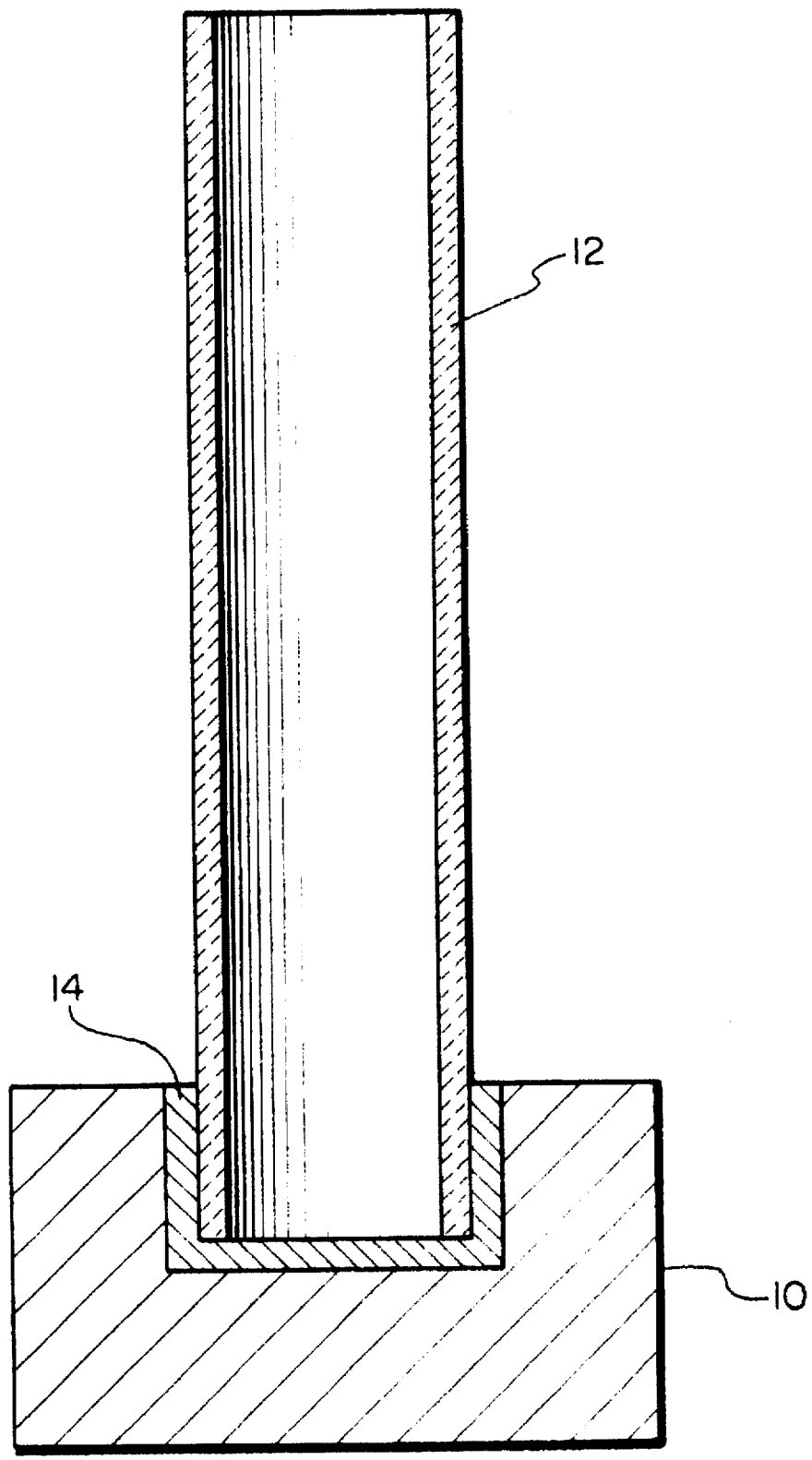
FIG. 1 is a cross-sectional view of a ceramic membrane tube, Inconel alloy, and sealant.

The ceramic of choice in the conversion of methane gas to synthesis gas: $CO+H_2$ (with oxygen from air as the oxidant) is obtained by the use of a ceramic membrane extruded from SFC-2 ($SrFeCo_{0.50}O_x$, wherein x is less than 3). The membrane may be tubular or other shapes. For convenience, the tubular geometry was used. In tests, the membrane tube has lasted more than 1000 hours at 850° C. during reactor operations and thus exhibited significant mechanical stability. Metal alloys considered for joining ceramic and metal are basically the Inconel alloys (nickel, chromium, iron alloys) because of superior oxidation resistance. Previous glass ceramic seals consisting of a mixture of silica, boric acid, aluminum, phosphorous pentoxide, and alkali metal oxides are inapplicable to ceramic membrane tubes of the type set forth because the seals degrade at temperatures in excess of about 370° C. and tend to react with the SFC-2 material.

The invention relates to a sealant and method of making it and its applications. Several materials which have been tested appear in Table 1, but the only satisfactory materials are the combinations of strontium oxide and $B_2O_3$.

TABLE 1

Glass-forming ceramics (glazing components with acceptable melting points[1]

| Material | Approximate Melting Point (°C.) |
| --- | --- |
| $SrO.B_2O_3$ | 1100 |
| $2SrO.B_2O_3$ | 1115 |
| $SrO.0.71B_2O_3$ | 980 |
| $BaO.B_2O_3$ | 1050 |
| $2BaO.B_2O_3$ | 1000 |
| $CuO.B_2O_3$ | 980 |
| $MgO.B_2O_3$ | 988 |

[1]F. Singer, Ceramic Glazes, Pacific Coast Borax Company, New York (1947), p. 69.

The combination including BaO, CuO, and MgO were found to be too reactive at operating temperatures to form adequate seals.

The metal to which the SFC-2 membrane will be sealed is preferably an Inconel alloy and may be any one of a number of Inconel alloys, the most preferred being Inconel 600 and 601 and 625. The sealant material is made by starting with powders. The appropriate amount of powders were dry mixed and sifted through a 60 mesh screen. Powders were then calcined twice at temperatures between 775° and 825° C. for about 16 hours. The melting points of the different compounds were determined by differential thermal analysis and are set forth in Table 1. The wetting and bonding behavior was observed by placing small pellets pressed from dry powder on an Inconel alloy and sintered SFC-2 plate and heating at temperatures greater than the melting point in an air furnace for about ½ hour. The screening studies showed that the preferred material has an approximate melting point of 1115° C., it being understood that these glass-like materials do not have a definite melting point. In $2SrO \bullet B_2O_3$, 2 moles of SrO are present for each mole of $B_2O_3$. The sealant is prepared by melting strontium carbonate and boric acid, wherein SrO and $B_2O_3$ are present in the molar ratio of 2 to 1. This produces a fritted compound of 2SrO•B$_2$O$_3$. This in turn is mixed with SFC-2 powder and melted to produce a fritted sealant compound. In this fritted compound, SFC-2 can be present in the range of 30–70 percent by weight of the total sealant material.

The preferred embodiment comprises two fritted compounds. The fritted compound of SFC-2 and the fritted compound of 2SrO•B$_2$O$_3$ are present in the ratio of 5 to 3, respectively.

Figure 2:
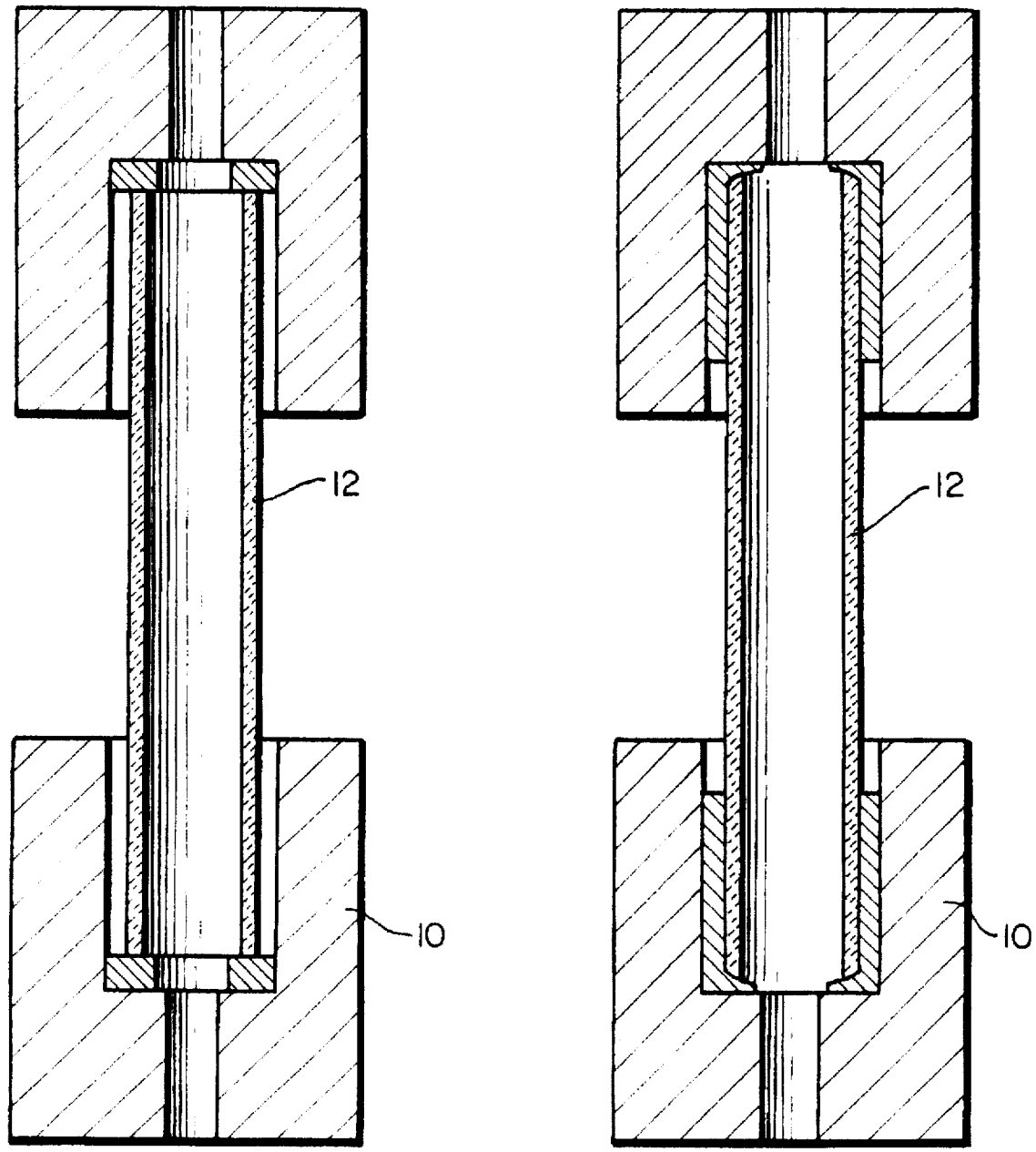
FIG. 2 is a cross-sectional view of a ceramic membrane tube, Inconel or other suitable alloy, and ceramic or sealant material, showing the formation of a seal at each end of the tube.

Referring to FIG. 1, an Inconel 600/601 alloy end cap 10 is used with a cavity measuring 0.265 inch diameter by 0.375 inch deep machined in the alloy end cap 10, the cap measuring 0.375 inch in diameter and 0.5 inch in length so that when the SFC-2 tube 12 is inserted into the cavity, the spacing between the tube and the Inconel alloy cap is between 0.0005 and 0.0018 inch. The spacing was filled with a powder made from the fritted combination of SFC-2 powder and 2SrO•B$_2$O$_3$. The fritted compound sealant powder (particle size: –325 mesh) weighing 0.1–0.2 gram was placed into the cavity and compacted to form a washer or disc-like seal with or without a small 0.125 inch diameter centered hole to permit gas passage. The compaction pressure was in the range of 7 to 9 ksi depending on whether the pressed seal is a disc or washer-like and thereafter heated with a SFC-2 tube sitting on top of the pressed sealant powder and heated to a temperature of about 1155° C. at a heating rate of 60° C./hour. The sealant was held at this temperature up to 0.5 hour and thereafter cooled at a rate of 120° C./hour to form seal 14. The seals 14 (FIGS. 1 and 2) made by this method were evaluated and subjected to internal and external pressure. Reliability of the seals 14 improves when the powdered frit from which the sealant was made was passed through –325 mesh screens. In fact, it is preferred that the powders from which the fritted sealant material is passed through screens from –200 mesh to –400 mesh. Seals were made with the fritted sealant (SFC-2+ 2SrO•B$_2$O$_3$) both with and without 2–4 wt. % of silver powder with a particle size of 1–3 microns. Addition of silver to ceramics is known to enhance the strength of ceramics. Several seals 14 (FIGS. 1 and 2) have been capable of holding internal pressures of 15 to 50 psig and external pressures of 80–200 psig at room temperature. A number of these seals 14 (FIGS. 1 and 2), when heated and reheated to 900° C. for 50 hours, have resulted in improved sealing rather than degradation of the seals. The sealed SFC-2 tubes also were tested at elevated temperature. In particular, seals were capable of holding 5 psig when the sealed tubes were held at 900°–910° C. for 48 hours. Preliminary examination of cross-sectional specimens showed that the interface between the SFC-2 and Inconel alloy is free of defects and well bonded. Scanning electron microscopy, in conjunction with energy-dispersive X-ray analysis of the interface, suggest that bonding occurred by dissolution/oxidation-reduction reactions.

Figure 3:
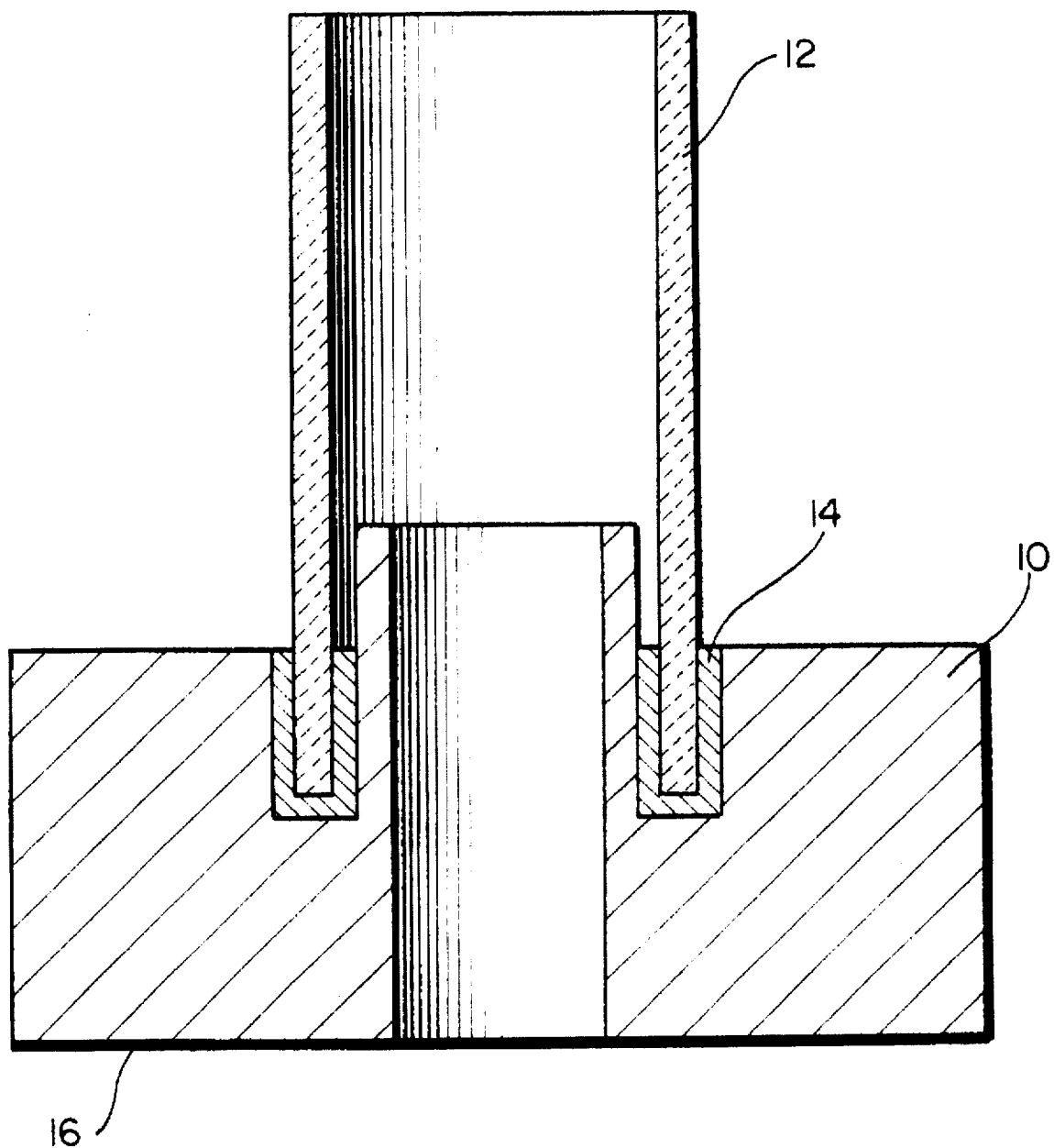
FIG. 3 is a cross-sectional view of a ceramic membrane tube, Inconel or other suitable alloy and ceramic or sealant material.

FIG. 3, discloses a possible alternative end cap construction believed to be an improved design in which an annular groove 16 is provided in the Inconel metal end cap or other suitable oxidation-resistant alloy base end cap 10. (FIG. 3). The ceramic SFC-2 membrane tube 12 is inserted into the annular groove 16 with sufficient spacing on both sides of the tubular membrane 12 and the bottom of the groove 16 in order for sealant 14 to be placed on all three sides, that is, the bottom and both sides of the tubular membrane 12. No tests have been made on this conceptual alternative design.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A fritted sealant material for sealing a ceramic tube of Sr, Fe, and Co oxides to an oxidation resistant nickel-based metal alloy, said sealant material comprising a compound of Sr oxide and boric oxide and Sr, Fe, Co$_{0.5}$O$_x$ present in the range of about 30 to about 70 percent by weight of the fritted sealant material.

2. The sealant material of claim 1, wherein x is less than 3.

3. The sealant material of claim 1, wherein the compound of Sr oxide and boric oxide is 2SrO•B$_2$O$_3$.

4. The sealant material of claim 1, wherein SrFeCo$_{0.5}$O$_x$ is present in an amount of about 70 percent by weight of the sealant material.

5. The sealant material of claim 1, and further comprising an oxidation-resistant alloy of a Ni-based alloy combined with said sealant material.

6. A fritted sealant material for sealing SrFeCo$_{0.5}$O$_x$ to an Inconel alloy, said sealant material consisting of a compound of SrO and B$_2$O$_3$ and a compound of Sr, Fe and Co oxides, wherein SrO is present in a mole ratio of between about 1 and 2 moles of SrO to each mole of B$_2$O$_3$, and wherein the compound of Sr, Fe and Co oxides is present in a range of from 30 to about 70 percent by weight of the total sealant material.

7. The fritted sealant material of claim 6, wherein SrO is present in a mole ratio of 2 moles of SrO for each mole of B$_2$O$_3$.

8. The fritted sealant material of claim 7, wherein SrFeCo$_{0.50}$O$_x$ is present in an amount of about 62 percent by weight of the fritted sealant material.

9. A combination of a membrane of SrFeCo$_{0.50}$O$_x$ and an Inconel alloy and a fritted seal between the membrane and alloy, said fritted seal being interposed between the alloy and the membrane and comprising a compound of Sr oxide and boric oxide, and a compound of Sr, Fe and Co oxides, wherein the compound of Sr, Fe and Co oxides is present in the range of from 30 to about 70 percent by weight of the fritted seal.

10. The combination of claim 9, wherein the membrane fits in an alloy end cap and fritted seal contacts the surfaces of the membrane and the alloy.

11. The combination of claim 9, wherein the membrane is tubular.

12. The combination of claim 11, wherein the end of the tubular membrane fits into the Inconel alloy with the fritted seal being present on the membrane tube, thereby sealing the tube to the Inconel alloy.

13. The combination of claim 12, wherein the tubular membrane has an end surface, and fritted seal is present between the end surface and the Inconel alloy.

14. The combination of claim 13, wherein the Sr oxide is SrO and is present in a mole ratio of between 1 and 2 moles of SrO to each mole of B$_2$O$_3$, and wherein the compound of Sr, Fe and Co oxides is SrFeCo$_{0.50}$O$_x$ and Ag being present in an amount of from zero to about 4 percent by weight of the fritted seal.

15. A method of sealing of SrFeCo$_{0.50}$O$_X$ membrane to an Inconel alloy, comprising preparing a homogeneous compound of SrO and B$_2$O$_3$ wherein SrO is present in a mole ratio of between 1 and 2 moles of SrO to each mole of B$_2$O$_3$, and a compound of oxides of Srf, Fe and Co wherein the compound of Sr, Fe and Co oxides is present in a range of from about 30 to about 70 percent by weight of the total of the compounds, compacting the compounds in the form of a disc or washer between the membrane and the alloy, and heating the homogeneous compound to above the melting point thereof to form a flitted seal.

16. The method of claim 15, wherein the compounds of SrO and $B_2O_3$ and oxides of Sr, Fe, and Co have an average particle size which passes through a −325 screen.

17. The method of claim 15, wherein the fritted compound of Sr, Fe, and Co oxides have an average particle size which passes through a −325 mesh screen.

18. The method of claim 16, wherein the compound of SrO and $B_2O_3$ is $2SrO\bullet B_2O_3$.

19. The method of claim 16, wherein the compound of the oxides of Sr, Fe and Co is $SrFeCo_{0.50}O_x$.

20. The method of claim 19, wherein the $SrFeCo_{0.50}O_x$ is present in an amount of about 5 parts by weight of compound $SrFeCo_{0.50}O_x$ to about 3 parts by weight of the compound of SrO and $B_2O_3$.

21. The method of claim 20, wherein the compound of SrO and $B_2O_3$ is essentially $2SrO\bullet B_2O_3$.

22. The method of claim 15, wherein the compounds are compacted by applying a force of at least about 7 ksi to the compounds.

23. The method of claim 22, wherein the fritted seal is heated to a temperature in excess of about 1115° C.

24. The method of claim 23, wherein Ag is present in the seal in an amount in the range of from about 2% to about 4% by weight of the fritted seal.

* * * * *

UNITED STATES PATENT AND TRADEMARK OFFICE
CERTIFICATE OF CORRECTION

PATENT NO. : 5,725,218
DATED : March 10, 1998
INVENTOR(S) : P. Subraya Maiya et al.

It is certified that error appears in the above-indentified patent and that said Letters Patent is hereby corrected as shown below:

Claim 08, line 31, delete "$SrFeCo_{0.50}O_x$" and insert -- $SrFeCo_{0.5}O_x$ --.
Claim 09, line 33, delete "$SrFeCo_{0.50}O_x$" and insert -- $SrFeCo_{0.5}O_x$ --.
Claim 14, line 56, delete "$SrFeCo_{0.50}O_x$" and insert -- $SrFeCo_{0.5}O_x$ --.
Claim 15, line 59, delete "$SrFeCo_{0.50}O_x$" and insert -- $SrFeCo_{0.5}O_x$ --.
line 63, delete "Srf and insert --Sr--.
Claim 19, line 12, delete "$SrFeCo_{0.50}O_x$" and insert -- $SrFeCo_{0.5}O_x$ --.
Claim 20, line 13, delete "$SrFeCo_{0.50}O_x$" and insert -- $SrFeCo_{0.5}O_x$ --.
Claim 20, line 01, delete "$SrFeCo_{0.50}O_x$" and insert -- $SrFeCo_{0.5}O_x$ --, Signed and Sealed this Twenty-third Day of June, 1998

Attest:

BRUCE LEHMAN

Attesting Officer

Commissioner of Patents and Trademarks